April 3, 1934.    R. E. WOOLLEY    1,953,328
INTEGRATING MECHANISM
Filed Aug. 20, 1932

INVENTOR
Rew E. Woolley.
BY
Raymond D. Junkins.
ATTORNEY

Patented Apr. 3, 1934

1,953,328

UNITED STATES PATENT OFFICE 1,953,328

INTEGRATING MECHANISM

Rew E. Woolley, Shaker Heights, Ohio, assignor to Bailey Meter Company, a corporation of Delaware Application August 20, 1932, Serial No. 629,681

22 Claims. (Cl. 235—61)

This invention relates to improvements in mechanisms for the integration of variables, especially for integrating variables with respect to time and where such variables may be of a physical, chemical, electrical, hydraulic, or other nature.

Integrators are known to those familiar with the art which operate in basically different manners and of various mechanical constructions and designs. Such integrators, so far as I know, however, when actuated through the positioning of mechanical members representing functions of the variable to be integrated and functions of time or of an independent variable with respect to which the variable is to be integrated, must be located in juxtaposition with the members which cause the actuation.

In my present invention I provide an integrating mechanism or system wherein it is possible to locate the register upon which the integrated result is to be accumulated, either adjacent to or remote relative to the actuating members whose positions are determined responsive to that which is to be integrated.

Furthermore, with the arrangement comprising my invention, it is not essential that an integration be performed, for I might utilize for other purpose a remote representation of a relation existing between a variable and time, or between a variable and an independent variable. For example, I might operate a recording mechanism something in the nature of a maximum demand device, or I might actuate a control apparatus, or position or operate devices and apparatus other than effecting an actuation of a remote or local register for integration.

One object of my invention is to provide an improved electrically-actuated integrating mechanism. Another object is to provide for driving an integrating register by means of a self-starting synchronous motor.

A further object is to provide an electrically-operated integrating mechanism which may be located remotely at a considerable distance from its actuator.

Still another object is to provide a system for integrating a variable with respect to time, wherein the register comprises an electric motor, which motor may be located adjacent to or at a considerable distance from the actuator.

A further object is to provide an electrically-actuated integrator which operates a register at a constant speed for varying portions of definite predetermined intervals of time, depending upon the value of the variable to be integrated with respect to time.

With these and further objects in view, which will be made apparent, I will now describe the preferred embodiments of my invention illustrated in the drawing.

Figure 1:
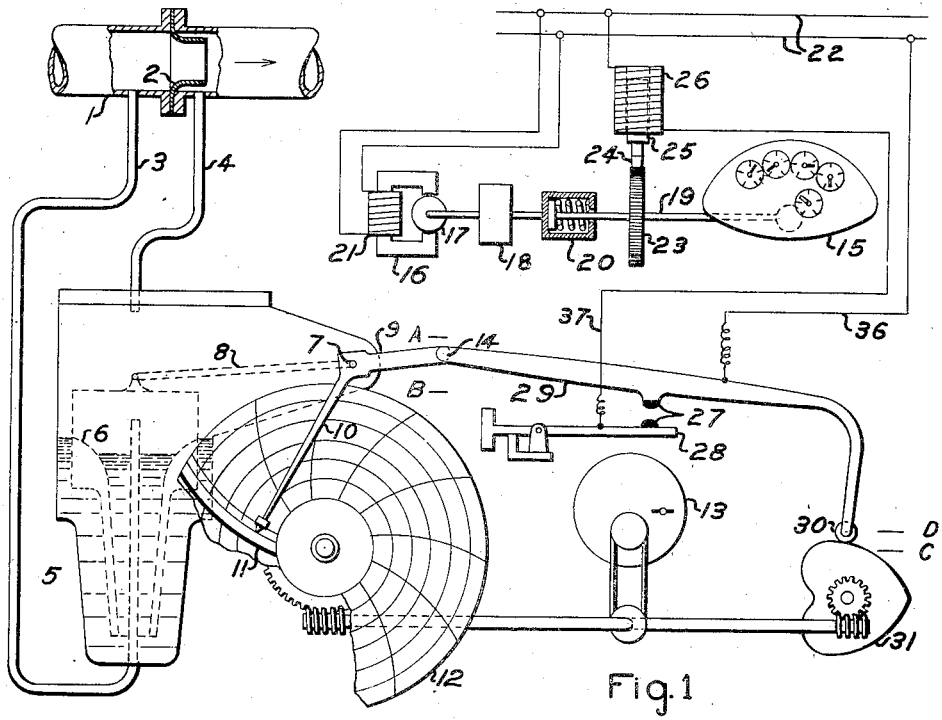
Fig. 1 is a somewhat diagrammatic representation of my invention in connection with a rate of flow meter for fluids.

A variable, such as the rate of flow of a fluid through the conduit 1, is desirably integrated with respect to time to give a total quantity of the fluid passing a given point during a specified interval of time, such as the interval between two readings of the register. I show positioned within the conduit 1, a flow nozzle 2 forming a restriction to flow through the conduit, and for creating thereby a pressure differential across the flow nozzle bearing a known relation to the rate of fluid flow therethrough. From the conduit 1 at opposite sides of the flow nozzle 2, I lead the pressure pipes 3 and 4 to a rate-of-flow meter, indicated in general at 5.

Such a rate-of-flow meter may be of the liquid sealed bell type as disclosed in the patent to Ledoux 1,064,748, granted June 17, 1913, wherein the bell is shaped and has walls of material thickness to the end that the positioning of the bell is in direct proportion to the rate of fluid flow, thereby correcting for the quadratic relation which exists between rate of fluid flow through such a flow nozzle and differential pressure resulting therefrom. The bell is shown at 6 diagrammatically in dotted lines and may be sealed by a liquid such as mercury whose approximate level within and without the bell is indicated.

Pressure within the conduit 1 ahead of the flow nozzle 2 is effective through the pipe 3 upon the interior of the bell 6, while pressure at the outlet of the flow nozzle 2 is effective through the pipe 4 upon the exterior of the bell 6, to the end that the bell is positioned vertically by the pressure differential across the flow nozzle and in linear relation to the rate of flow of the fluid.

Such vertical positioning of the bell results in angular positioning about a fixed fulcrum point 7, of an arm 8, for transmitting motion from the bell to the shaft of the fulcrum 7, for positioning an arm 9 whose function will be explained hereinafter, and for positioning an indicating pen or pointer 10 cooperating with an index 11. The pen 10 is further adapted to record over a circular recording chart 12 which is desirably driven uniformly at a constant speed by a motor 13 which may be a spring-wound motor such as a clock, or a synchronous electric motor, or otherwise.

I have shown the flow meter 5 in a position indicating a rate of flow approximately 20% of maximum, wherein the free end 14 of the arm 9 is in the shown position intermediate the positions A and B, respectively indicating the position of the point 14 at zero rate of flow and at maximum rate of flow.

I provide in connection with the flow meter 5 a register 15, desirably remotely located from the flow meter 5 and having graduated dials with pointers moving in conjunction therewith, for affording a continuously available means of reading the accumulated total flow of fluid through the conduit 1, which total flow for any desired interval may be obtained by subtracting the reading of the dials of the register 15 at the beginning of the interval from the reading of the dials at the end of the interval, the difference between such readings representing the total flow between the beginning and the end of the interval of time. The arrangement being such that the total is the integration of the rate of flow of fluid with respect to time.

For driving the register 15, which in itself contains the necessary gear reduction between dials, I provide a self-starting, single-phase, synchronous motor 16, substantially independent of voltage changes, and whose speed is directly and solely dependent upon the frequency of the alternating current applied thereto.

The motor has a rotor 17 for driving the register 15 through a gear reduction 18 and shaft 19. Interposed in the shaft 19 is a friction means 20, wherein the shaft 19 is actually broken but the two parts held in frictional engagement by means of a spring, to the end that if that part of the shaft 19 connected to the register 15 is locked or held against rotation, the friction means will slip, allowing the motor 16 to continue to rotate the shaft 19 on the motor side of the friction means 20. The motor 16 is provided with a field coil 21 energized across an alternating current source 22.

To provide a means for locking or unlocking that part of the shaft 19 connected to the register 15, I provide a locking wheel 23, positioned on the shaft 19 between the friction means 20 and the register 15, and adapted to turn with the shaft 19 when unlocked through disengagement of a pawl 24. The pawl 24 forms an extension of the core 25 of a solenoid 26, connected across the power source 22.

In circuit with the solenoid 26 across the power source 22 is a switch comprising contact points 27. The arrangement is such that to allow an actuation of the register 15, I unlock the locking wheel 23 by electrically moving out of engagement therewith the pawl 24, and when the locking wheel is unlocked, the friction means 20 causes a driving of the register at a constant rate of speed by the motor 16. I desirably unlock the locking wheel periodically and for a time portion of each period, of a length determined not only by the value of the variable (rate of fluid flow) at the beginning of the period but modified by any change in the value of the rate of flow during that portion of the period when the locking wheel is unlocked; i. e., at the beginning of each period of time, I cause an unlocking of the locking wheel and the portion of the period during which the locking wheel is unlocked, for driving, is determined by the rate of flow at the beginning of the period but the portion is modified by any change in the rate of flow which occurs during the portion.

I therefore provide a register for indicating the summation or integration of variables, operated by electrically-actuated means and which may be remotely located from the actuator, the interconnections therebetween comprising electric conductors. At the contact points 27, I provide a means for making and breaking circuit to the solenoid 26, arranged so that the length of time during which the circuit is closed is representative of the amount of actuation I desire to impart to the register remotely located. I preferably divide time into definite intervals and close the electric circuit at the actuator during each interval of time, for an increment of time length determined by the value of the variable to be integrated with respect to time, in this case the rate of fluid flow through the conduit 1. However, while the increment of time is in length primarily determined by the instantaneous value of the variable at the instant of initiating the increment, nevertheless the increment length is continuously modified throughout its duration in accordance with any change in the value of the variable throughout the duration of the increment. While I have illustrated and will describe the operation in detail of the actuator mechanism and the integrator mechanism and system in general as applied to the integration of a variable such as the rate of fluid flow, with respect to time, the concept of my invention which I have, is that the variable to be integrated with respect to time need not be the rate of fluid flow but may be any desirable variable to be integrated with respect to time. Furthermore, the mechanism is not necessarily limited to an integration of a variable with respect to time, but is capable of performing any integration of a variable with respect to an independent variable as represented by the mathematical expression:

$$\Sigma y \Delta x$$

At the fluid meter 5 and in connection with the same, I provide as an actuator or transmitting element for the register 15, a circuit closing arrangement, of which the contacts 27 when close-circuited energize the solenoid 26 across the source of power 22, for operation of the pawl 24. One of the contacts 27 is carried by a relatively heavy arm 28, adapted through gravity to assume a position around a pivot point to engagement with a stop as shown in Fig. 1. The other contact 27 is carried by a freely floating member 29, capable of being positioned along a definite path in a single plane in space. The member 29 is pivotally connected at one end to the arm 9 of the flow meter at 14, so that that end of the member 29 is at the position A when there is zero flow through the conduit 1, and at a position B when there is a maximum flow through the conduit 1, thus traversing a predetermined path in a single plane in space.

The opposite end of the member 29 carries a roller 30 which, by gravity, bears against and in contact with the surface of a cam 31 in a manner such that the end of the member 29 is continually reciprocated at a substantially uniform speed between limits of travel C and D, through rotation of the cam 31 driven by the clock motor 13. The chart 12, for example, may be arranged to make one revolution in 24 hours, while the speed of the cam 31 might be in the nature of one revolution in 10 seconds. It will be seen then that the member 29 is arranged for positioning along a definite path within limits of travel in a single plane in space, such that movement of the member is angularly about either end, by the positioning of the opposite end between definite limits of travel, so that the contact 27 carried by the member assumes a position between limits of travel dependent upon the position of the point 14 and of the roller 30.

The stop provided for the contact arm 28 is so located that when the arm 28 is positioned through gravity in its lowermost position, the contacts 27 will just fail to be closed if the point 14 is at A, representing zero rate of fluid flow, and throughout complete reciprocation of the roller 30 between C and D. In other words, when there is zero rate of fluid flow, the contacts 27 would just fail of being closed, regardless of the number of reciprocations of the roller 30 by the time driven cam 31.

Thus, at any given rate of fluid flow corresponding to a definite position of the point 14, the contact 27, carried by the member 29, is reciprocated along a definite path in the plane of movement of the member 29, and by the reciprocation between the limits C and D of the roller 30. When the point 14 is at B, representing maximum rate of fluid flow, then the contacts 27 may be close-circuited throughout the entire or major portion of the reciprocation between the points C and D of the roller 30.

It will be seen that when the contacts 27 are close-circuited, the solenoid winding 26 is energized, the core 25 is pulled upwardly, and the pawl 24 is disengaged from the locking wheel 23, whereby the continuously operating motor 16 drives through the friction means 20 and shaft 19 to actuate the register 15. Thus, the length of time through which the register 15 is operated depends upon the length of time that the contacts 27 are close-circuited, and this in turn is determined by that portion of the time cycle of the cam 31 through which the contact carried by the member 29 engages that contact 27 carried by the arm 28, and such portion is determined by the position of the point 14 along the path A—B.

As the cam 31 is rotated, the position of the point 14 determines what portion of such rotation is used for driving the register 15 through close-circuiting the contacts 27, but the drive is continually modified through the fact that the point 14 is free to change its position along the path A—B during actuation of the register 15. Thus, the increment of movement of the register 15 for each revolution of the cam 31, that is, for each predetermined time interval, is a function of the rate of flow throughout that interval.

Certain features of the actuator arrangement and relationship desirably existing between the location of various parts of the mechanism are not claimed herewith, but are disclosed and claimed in the patent to Harvard H. Gorrie, No. 1,892,183 granted December 27, 1932, and having the same assignee. Other features of the arrangement, particularly directed to remote electrical actuation and integration, are disclosed and claimed in my Patent No. 1,892,184 granted December 27, 1932, and having the same assignee.

It will be understood that when I speak of one end of the member 29 being reciprocated between prpedetermined definite limits of travel C—D, I mean that the point of contact of the roller 30 with the cam 31, moves between the limits C—D.

When I speak of the other end of the member 29 being positioned or reciprocated between the limits of travel A—B, I mean on that end, the pivot point 14 which in its extremes of travel lies on the line A or on the line B.

It will be understood that in referring to reciprocation I do this broadly and do not limit myself to reciprocation along an exactly straight line in both directions, but mean such reciprocation modified by angularity or similar effect, as is well known in the type of linkage connections and arrangement disclosed herein. For example, while I state that the contact point of the roller 30 with the cam 31 is reciprocated between the limits C and D, the point of contact does not definitely follow a single straight line between these limits, for this depends upon the position of the pivot point 14 between its limits of travel and the time of reciprocation of the other end of the member 29. However, for the purpose of illustration, the reciprocation between the limit C—D is substantially along a single straight line. The positioning of the pivot point 14 between the limits A—B follows substantially a single path, but the movement of the actuating or contact point 27 carried by the member 29 may vary slightly from a straight line, dependent upon relative positions of the two ends of the member 29. To all intents and purposes, the movements of the two ends of the member and of the contact point carried by the member are along single straight lines in the plane of movement of the member 29, for I can readily take care of correcting for angularity or other well known effects through proportioning of moment arms, design of the cam 31, etc.

Figure 2:
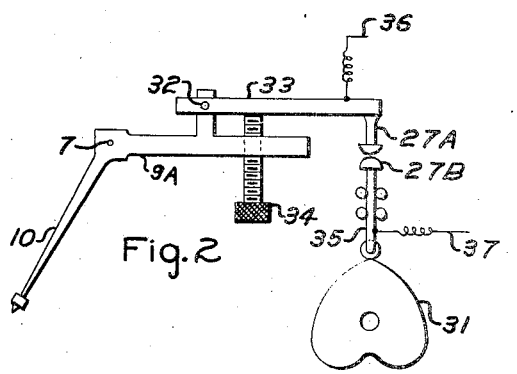
Fig. 2 is a view of a part of Fig. 1 comprising a modification thereof.

I illustrate in Fig. 2, a part of the showing of Fig. 1 incorporating a modification thereof. Positioned by the flow meter bell 6, around the pivot point 7, is again shown the indicator arm and marker 10, while moving with it is an arm 9A, having intermediate its ends an extension bearing a pivot point 32 to which is pivotally connected a member 33. At the far end of the member 33 is carried a contact point 27A adapted for substantial vertical positioning. Normally, the member 33 by gravity rests against a stop comprised of the end of a threaded adjusting screw 34 threaded through one end of the beam 9A.

I show a time driven cam 31 periodically reciprocating a guided contact bar 35 having a contact 27B on its uppermost end, moving periodically relative to contact 27A. The contacts 27A, 27B are in the circuit of the solenoid coil 26 as in Fig. 1, conductor 36 joining power source 22, and conductor 37 joining the solenoid winding 26.

In the arrangement shown in Fig. 2, the rate of flow is of zero value wherein the contact 27A is held at its shown position through gravity action of the member 33 pivoting around 32 against the uppermost end of the adjusting screw 34. Periodic reciprocation of the contact 27B just fails to close-circuit with 27A. However, as the rate of fluid flow increases above zero value, the pointer 10 and arm 9A move in clockwise rotation, followed thereby through force of gravity by the member 33 and contact 27A.

Upon rotation of the cam 31, the contact bar 35 will, through a certain portion of each revolution of the cam 31, cause engagement between the contact 27A, 27B, and the length or time period of such engagement will be that portion of each cam revolution dependent upon the rate of fluid flow, or the position of the arm 9A in rotation around the pivot 7.

When the rate of fluid flow is greater than zero, the upward movement of the contact 27B engaging the contact 27A will cause a lifting of the end of the adjusting member 33 away from the end of the adjusting screw 34, in counter-clockwise rotation around the pivot 32 for a portion of the cam rotation, and a lowering of the member 33 for a substantially equal portion of the cam rotation. It will be apparent, however, that the position of the arm 9A, the pivot 32, the stop screw 34, and the left-hand end of the member 33 will depend entirely upon the rate of fluid flow, and therefore during each cam cycle the solenoid 26 will be energized for a length of time dependent upon the rate of fluid flow at the beginning of the period, but modified during the period of actuation by any change in the rate of fluid flow.

Figure 3:
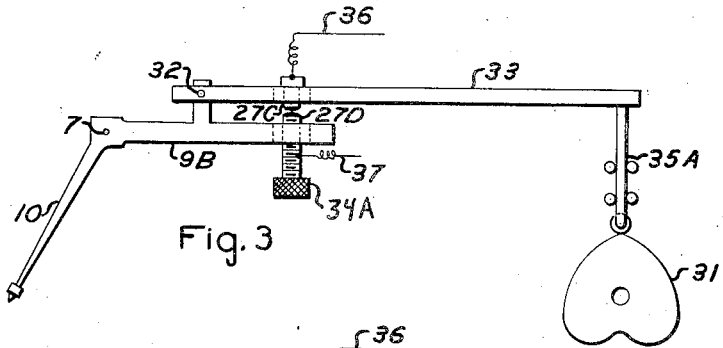
Fig. 3 is a view similar to Fig. 2 showing a further modification.

In Fig. 3 I show an arrangement somewhat similar to that of Fig. 2, comprising a modification of a fragment of the complete arrangement of Fig. 1. In Fig. 3, an arm 9B is similar to the arm 9A of Fig. 2 and is moved angularly about the pivot 7 responsive to the fluid rate of flow. The adjusting screw stop 34A is similar to 34, except that its uppermost end at 27D comprises a contact joined by the wire 37 to the solenoid 26. The screw 34A is threaded through an insulating bushing in the arm 9B.

In the member 33 is another insulating bushing through which is located a mating contact 27C joined by the conductor 36 to the power source 22. A bar 35A carrying a roller at its lowermost end, is positioned in a guided manner vertically by periodic rotation of the time actuated cam 31. Its uppermost end is adapted to engage the member 33 for angular positioning of the member around the pivot 32.

Throughout each period of time as represented by each revolution of the cam 31, the contacts 27C, 27D will be close-circuited for a time length, dependent upon the rate of flow at the beginning of the engagement, modified by any change in rate of flow during the time of engagement.

The embodiments illustrated in Figs. 2 and 3 serve for remotely electrically actuating the register 15 for integrating a variable with respect to an independent variable, or for otherwise remotely electrically effecting an actuation whose time length or amount of actuation is determined by changing values of a variable with respect to an independent variable. The arrangements of Figs. 2 and 3 differ from that of Fig. 1 insofar as the actuator or sending end is concerned, and may be used with the receiving-integrating remotely located arrangement of Fig. 1, or otherwise, as desired.

I have illustrated in all three of the drawings a pair of electrical contacts adapted to be close-circuited for varying portions of definite intervals of time. I illustrate the definite intervals of time as accomplished by a cam rotated uniformly at a constant speed by time actuated mechanism. The varying portions are representative of the value of the variable such, for example, as fluid rate of flow which is to be integrated or otherwise utilized in relation to time or an independent variable.

In Fig. 1, I show one of the contacts 27 positioned by a member in turn responding to time actuated mechanism and to mechanism positioned in accordance with the variable. In Fig. 2, the contact 27A is positioned in accordance with the value of the variable, while the contact 27B is positioned by the time cam. In Fig. 3, the contact 27C is positioned by rate of fluid flow and by time, while the contact 27D is positioned only by rate of fluid flow. It will be evident that certain proportioning and arrangement of the different parts will allow desirable functional relationing between the variable and the integration or actuation. For example, the time length of contact of the arrangement illustrated in Fig. 3 is in functional relation to a position determined by flow and to a position determined by flow and time. Thus, I may bring in a desired functional relation of the variable which is positioning the member 9B, differing from the functional relation of the variable as illustrated in Fig. 1.

It will be noted that Fig. 3 is so arranged that it is assumed that the indicator 10 is at maximum reading relative to its index or recording chart and substantially the full cycle of rotation of the cam 31 is utilized in closing circuit between 27C and 27D. As the rate of flow decreases from maximum, the indicator moves in a clockwise direction, moving the contact 27D in a clockwise direction and decreasing the portion of each period of cam rotation during which the contacts 27C, 27D are close-circuited. I might equally as well consider the electric circuit arranged so that the integration would be proportional to the open-circuited portion of the time cycle, or to the close-circuited portion of the time cycle.

While I have illustrated and described certain preferred embodiments of my invention, it is to be distinctly understood that I am not to be limited thereby, except as to the claims appended hereinafter in view of prior art. For example, it is not necessary that the variable which I desire to integrate be rate of fluid flow, nor must such variable necessarily be integrated with respect to time. Furthermore, the mechanical and electrical construction and features as illustrated and described may be departed from, as will be readily understood by those familiar with the art, while still maintaining the features of the invention. Furthermore, I may effect a remote control of electrically-actuated devices as illustrated and described, based on an integration of a variable with respect to an independent variable, but not necessarily actuating a register thereby. I may utilize other types of motors than those described and otherwise vary the general arrangement while still maintaining the spirit of the invention.

What I claim as new, and desire to secure by Letters Patent of the United States, is:

1. In an integrator, a constant speed normally operating driving shaft, a register, a normally inoperative driven integrating shaft for operating the register, friction means connecting the shafts, locking means for the integrating shaft whereby when said shaft is locked the friction means slips, and means positioned in accordance with a variable to be integrated for periodically electrically releasing the locking means.

2. In an integrator, a constant speed normally operating driving shaft, a register, a normally inoperative driven integrating shaft for operating the register, friction means connecting the shafts, locking means for the integrating shaft, and electrical means for releasing said locking means whereupon the driving shaft operates the register at a constant speed, said electrical means responsive to a member positioned in accordance with time and in accordance with a variable, whereby the variable is integrated with respect to time.

3. In an integrator, a constant speed normally operating driving shaft, a register, a normally inoperative driven integrating shaft for operating the register, friction means connecting the shafts, locking means for the integrating shaft, and electrical means for releasing said locking means whereupon the driving shaft operates the register at a constant speed, said last-named means comprising a member adapted to be positioned along a definite path in a plane, one end of the member periodically reciprocated at a substantially uniform rate between definite limits of travel, the other end of the member positioned proportional to the value of a variable between definite limits of travel, whereby the variable is integrated with respect to time.

4. An integrating device comprising in combination, a register, a constantly rotating driving means, a shaft for transmitting motion from the driving means to the register, a friction means interposed in said shaft, a locking wheel carried by the shaft and between the friction means and the register, a pawl for locking the locking wheel against rotation, and a member adapted to electrically effect a release of said pawl whereby the driving means may actuate the register through the shaft and friction means.

5. An integrating device comprising in combination, a register, a normally operative electric motor, a shaft for transmitting motion from the motor to the register, a friction means interposed in said shaft, a locking wheel carried by the shaft and between the friction means and the register, a pawl for locking the locking wheel against rotation, and a member adapted to electrically effect a release of said pawl whereby the motor may actuate the register through the shaft and friction means.

6. An integrating device comprising in combination, a register, a normally operative electric motor, a shaft for transmitting motion from the motor to the register, a friction means interposed in said shaft, a locking wheel carried by the shaft and between the friction means and the register, a pawl for locking the locking wheel against rotation, and a member adapted to electrically effect a release of said pawl whereby the motor may actuate the register through the shaft and friction means, said member comprising a means capable of being positioned along a definite path in one plane, one end of the member reciprocated at a substantially uniform rate along a given path in the plane, the other end of the member positioned between limits in accordance with a function of the variable to be integrated with respect to time.

7. Apparatus comprising in combination, a normally operating motor, a normally inoperative driven shaft, a device adapted to be operated by said driven shaft, friction means connecting the motor to the driven shaft, locking means for the normally inoperative driven shaft, and means for electrically effecting an unlocking of said locking means whereupon the motor operates the device at a constant speed, said last-named means responsive to a member positioned in accordance with a variable and in accordance with an independent variable.

8. An integrating device comprising in combination, a register, a normally operative electric motor for driving the register, friction means interposed between the motor and the register, locking means for the register, an electric means for unlocking said locking means whereby the motor operates the register, and a pair of normally disengaged contacts for controlling said electric unlocking means, one of said contacts periodically reciprocated along a definite path, the other of said contacts positioned in accordance with the instantaneous value of a variable to be integrated with respect to time.

9. An integrating device comprising in combination, a register, a normally operative electric motor for driving the register, friction means interposed between the motor and the register, locking means for the register, an electric means for unlocking said locking means whereby the motor operates the register, and a pair of normally disengaged contacts for controlling said electric unlocking means, one of said contacts periodically reciprocated along a definite path, the other of said contacts carried by a member and moved in reciprocation through a distance representative of the instantaneous value of a variable to be integrated with respect to time.

10. An integrating device comprising in combination, a register, a normally operative electric motor for driving the register, friction means interposed between the motor and the register, locking means for the register, an electric means for unlocking said locking means whereby the motor operates the register, and a pair of normally disengaged contacts for controlling said electric unlocking means, one of said contacts periodically reciprocated along a definite path, the other of said contacts carried by a member and moved in reciprocation through a distance representative of the instantaneous value of a variable to be integrated with respect to time and modified by change in the value of the variable during such reciprocation.

11. Apparatus for electrically effecting an actuation, comprising a member carrying at one end an electric contact and adapted to be oscillated within predetermined limits of travel about a pivot at its other end, said pivot positioned responsive to the instantaneous value of a variable, and a cooperating electric contact periodically reciprocated by a time actuated mechanism and adapted to engage the first-mentioned contact when the value of the variable is greater than zero.

12. Apparatus for electrically integrating a variable with respect to time, comprising an oscillatable member carrying an electric contact and adapted to be oscillated relative to a limit of travel about a pivot, said pivot and travel limit positioned responsive to the instantaneous value of the variable, and a cooperating electric contact positioned by time actuated means, said contacts adapted for engagement during varying portions of predetermined increments of time when the value of the variable is greater than zero.

13. Apparatus for electrically integrating a variable with respect to an independent variable, comprising an oscillatable member carrying an electric contact and adapted to be oscillated relative to a limit of travel about a pivot, said pivot and travel limit positioned responsive to the instantaneous value of the variable, and a cooperating electric contact positioned responsive to an independent variable, said contacts adapted for engagement during varying portions of predetermined increments of time when the value of the variable is greater than zero.

14. In an integrator, a constant speed normally operating driving shaft, a register, a normally inoperative driven integrating shaft for operating the register, an apparatus comprising a member positioned according to time and in accordance with a variable for periodically electrically effecting an operative engagement between the driving and driven shafts whose duration is proportional to an instantaneous value of the variable modified by change in such value during the engagement.

15. In an integrator, a constant speed normally operating driving shaft, a register, a normally inoperative driven integrating shaft for operating the register, an apparatus comprising a member positioned by an independent variable and by a variable for periodically electrically effecting an operative engagement between the driving and driven shafts whose duration is proportional to an instantaneous value of the variable modified by change in such value during the engagement.

16. Apparatus comprising in combination, a constant speed normally operating driving shaft, a normally inoperative driven shaft, and a member positioned by a variable and by an independent variable for periodically closing an electric contact to effect an operative engagement between the driving and driven shafts whose duration is proportional to an instantaneous value of the variable modified by change in such value during the engagement.

17. In an integrator for integrating a variable with respect to time, a constant speed normally operating driving shaft, a register having a normally inoperative driven shaft, friction means inter-connecting the shafts, locking means for the driven shaft, electrically operable means for unlocking said locking means whereupon the register is driven at a constant speed, and apparatus comprising a member positioned in accordance with time and in accordance with the variable for periodically making effective the electrically operable means for time periods depending upon an instantaneous value of the variable.

18. In an integrator for integrating a variable with respect to an independent variable, a constant speed normally operating driving shaft, a register having a normally inoperative driven shaft, friction means interconnecting the shafts, locking means for the driven shaft, electrically operable means for unlocking said locking means whereupon the register is driven at a constant speed for time increments of varying duration, and apparatus comprising a member positioned in accordance with the variable and in accordance with the independent variable for periodically making effective said electrically operable means, the duration of the increments of register driving being proportional to an instantaneous value of the variable modified by change in such value during the increment.

19. Apparatus comprising in combination, a normally operating synchronous motor, a normally inoperative driven shaft, a device adapted to be operated by said driven shaft, friction means connecting the motor to the driven shaft, locking means for the normally inoperative driven shaft, and means for electrically effecting an unlocking of said locking means whereupon the motor operates the device at a constant speed, said last-named means responsive to a member positioned in accordance with the instantaneous value of a variable.

20. Apparatus for electrically effecting an actuation, comprising in combination, a normally operating motor, a normally inoperative driven shaft, a device adapted to be operated by said driven shaft, friction means connecting the motor to the driven shaft, locking means for the normally inoperative driven shaft, and means positioned by a device which measures the instantaneous value of a variable for electrically effecting an unlocking of said locking means whereupon the motor operates the device at a constant speed for periods of time length determined by the instantaneous value of the variable at the time of unlocking modified by changes in value of the variable during the time the locking means is unlocked.

21. Apparatus comprising in combination, a constant speed normally operating driving shaft, a normally inoperative driven shaft, a device adapted to be operated by said driven shaft, and electrical means for operatively connecting said shafts, said means responsive to a member positioned by a variable and by an independent variable.

22. In a measuring apparatus, a member positioned in accordance with the magnitude of a variable and provided with an electric contact, a constant speed normally operative synchronous motor, a cam rotated thereby, a follower periodically reciprocated by said cam and carrying an electric contact adapted to engage said first-named contact, and a registering device, said contacts cooperating in the control of said registering device.

REW E. WOOLLEY.